United States Patent
Yahagi et al.

(10) Patent No.: US 9,531,127 B2
(45) Date of Patent: Dec. 27, 2016

(54) POWER FEED CONNECTOR

(71) Applicant: FUJIKURA LTD., Koto-ku, Tokyo (JP)

(72) Inventors: Keiji Yahagi, Sakura (JP); Kenji Takahashi, Sakura (JP); Go Katsura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/104,612

(22) PCT Filed: Dec. 12, 2014

(86) PCT No.: PCT/JP2014/082968
§ 371 (c)(1),
(2) Date: Jun. 15, 2016

(87) PCT Pub. No.: WO2015/093400
PCT Pub. Date: Jun. 25, 2015

(65) Prior Publication Data
US 2016/0322748 A1 Nov. 3, 2016

(30) Foreign Application Priority Data
Dec. 16, 2013 (JP) .................. 2013-259585

(51) Int. Cl.
*H01R 13/625* (2006.01)
*H01R 13/639* (2006.01)
(Continued)

(52) U.S. Cl.
CPC ......... *H01R 13/639* (2013.01); *B60L 11/1818* (2013.01); *H01R 13/6275* (2013.01); *H01R 2201/26* (2013.01)

(58) Field of Classification Search
CPC ............ H01R 13/629; H01R 13/62933; H01R 2201/26; H01R 13/639; H01R 13/6275
See application file for complete search history.

(56) References Cited

U.S. PATENT DOCUMENTS 3,345,604 A   10/1967   Henschen et al.
5,575,675 A   11/1996   Endo et al.
(Continued)

FOREIGN PATENT DOCUMENTS

EP   2 426 791 A1   3/2012
JP   06-236780 A    8/1994
(Continued)

OTHER PUBLICATIONS

"Connectors applicable to Quick Charging System at Eco—Station for Electric Vehicles", Japan Electric Vehicle Association Standard, JEVS G 105-1993, Nov. 12, 1993.
(Continued)

*Primary Examiner* — Xuong Chung Trans
(74) *Attorney, Agent, or Firm* — Sughrue Mion, PLLC

(57) ABSTRACT

A power feed connector includes: a tubular case that has a front end opening portion being open at a front end in a central axis direction; a connector main body that is accommodated inside the tubular case and is slidable in the central axis direction; an operation lever portion that has a first end being disposed inside the tubular case; a link mechanism that is directly connected to the connector main body and the operation lever portion and converts a turning motion of the operation lever portion into a linear motion of the connector main body in the central axis direction; and a grip portion that is integrally provided with the tubular case and extends in a direction intersecting the central axis direction.

12 Claims, 5 Drawing Sheets

(51) Int. Cl.
*H01R 13/627* (2006.01)
*B60L 11/18* (2006.01)

(56) References Cited

U.S. PATENT DOCUMENTS

| | | | |
|---|---|---|---|
| 5,637,977 A | 6/1997 | Saito et al. | |
| 5,674,086 A | 10/1997 | Hashizawa et al. | |
| 5,873,737 A | 2/1999 | Hashizawa et al. | |
| 6,283,781 B1 | 9/2001 | Mori | |
| 8,197,277 B1 * | 6/2012 | Teichmann | B60L 11/1818 439/304 |
| 8,562,370 B2 * | 10/2013 | Takagi | H01R 13/6275 439/345 |
| 8,882,525 B2 * | 11/2014 | Mori | B60L 11/1818 439/310 |
| 9,106,015 B2 * | 8/2015 | Ohmura | H01R 13/6275 |
| 9,172,182 B2 * | 10/2015 | Toratani | H01R 13/627 |
| 2002/0177348 A1 | 11/2002 | Karamatsu et al. | |

FOREIGN PATENT DOCUMENTS

| | | |
|---|---|---|
| JP | 07-067210 A | 3/1995 |
| JP | 07-282902 A | 10/1995 |
| JP | 09-223534 A | 8/1997 |
| JP | 2001-135414 A | 5/2001 |
| JP | 2002-352909 A | 12/2002 |
| JP | 2011-138643 A | 7/2011 |
| JP | 2011-238633 A | 11/2011 |

OTHER PUBLICATIONS

Office Action for Japanese Application No. 2013-259585 dated Oct. 14, 2014.
Notice of Allowance for Japanese Application No. 2013-259585 dated Jan. 6, 2015.

* cited by examiner

US 9,531,127 B2

POWER FEED CONNECTOR

CROSS REFERENCE TO RELATED APPLICATIONS

This application is a National Stage of International Application No. PCT/JP2014/082968 filed Dec. 12, 2014, claiming priority based on Japanese Patent Application No. 2013-259585 filed Dec. 16, 2013, the contents of all of which are incorporated herein by reference in their entirety.

TECHNICAL FIELD

The present invention relates to a power feed connector which is used for charging an electromotive machine such as an electric automobile.

Priority is claimed on Japanese Patent Application No. 2013-259585, filed Dec. 16, 2013, the content of which is incorporated herein by reference.

BACKGROUND ART

In the related art, for example, as shown in PTL 1 and PTL 2, a power feed connector used for charging an electromotive machine such as an electric automobile and the like which are driven by electric power includes a connector main body and an operation lever. The connector main body is mounted in a tubular case so as to freely slide in an axial line direction and has a plurality of terminals. The operation lever operates movement (linear movement) of the connector main body. A first end portion or an intermediate portion of the operation lever is turnably supported inside the tubular case, and a second end portion of the operation lever protrudes to the outside of the case.

In order to cause the connector main body to advance with respect to the tubular case, the power feed connectors of PTL 1 and PTL 2 are configured such that the second end portion of the operation lever turns in an advancing direction with respect to the tubular case. In a state where the connector main body is caused to advance with respect to the tubular case, the second end portion of the operation lever is positioned on an outer circumferential surface of the tubular case.

In addition, the power feed connector of PTL 1 includes biasing device which urges the connector main body in a retreating direction with respect to the tubular case. In the power feed connector of PTL 1, when the second end portion of the operation lever is turned in the retreating direction in a state where the connector main body is positioned at an advanced position, the connector main body moves to the rear side of the tubular case due to biasing force of the biasing device.

Meanwhile, in the power feed connector of PTL 2, the operation lever and the connector main body are joined to each other by a gear mechanism (a gear or a rack). Accordingly, the connector main body moves in a forward-rearward direction of the tubular case in accordance with the operation lever turning in the forward-rearward direction.

PRIOR ART DOCUMENTS

Patent Documents

[PTL 1] Japanese Unexamined Patent Application, First Publication No. 2011-138643

[PTL 2] Japanese Unexamined Patent Application, First Publication No. 2011-238633

DISCLOSURE OF INVENTION

Problem to be Solved by Invention

However, in power feed connectors of PTL 1 and PTL 2, the following problems have occurred when a connector main body retreats.

First, in the power feed connector of PTL 1, biasing force of which a user (worker) is not conscious is applied in a retreating direction by biasing device. Accordingly, when the user releases an operation lever after a terminal of the connector main body is drawn out from a terminal storage portion of a power receiving connector, there are cases where the connector main body vigorously moves to a rear end of a tubular case due to biasing force of the biasing device. In this case, a shock is applied to the structure inside the tubular case including the connector main body. Accordingly, the structure inside the tubular case has to be configured to be made from a member having high strength, and thus, the manufacturing cost of the power feed connector increases.

In addition, in a method of using the biasing device, in a case where fitting force between the connector main body and the power receiving connector is excessively significant, there is concern that the connector main body is not drawn out from the power receiving connector due to dimensional tolerance between the connector main body and the power receiving connector or deformation thereof, dimensional tolerance in the terminals of the connector main body and the power receiving connector or deformation thereof, and the like.

Subsequently, in the power feed connector of PTL 2 including a gear mechanism, in a case where the fitting force between the connector main body and the power receiving connector is excessively significant, when the connector main body is moved to the rear side of the tubular case by turning the operation lever, excessive force is applied to an engagement portion between gears. Accordingly, there is concern that tooth skipping occurs and the connector main body is not drawn out from the power receiving connector due to dimensional tolerance between the connector main body and the power receiving connector or deformation thereof, dimensional tolerance in the terminals of the connector main body and the power receiving connector or deformation thereof, and the like.

In addition, in a case where the power feed connector is neglected on the ground, there are cases where an automobile or the like runs over the power feed connector. If a second end portion of the operation lever is positioned on an outer circumferential surface of the tubular case as that in the power feed connector in the related art, stress is likely to be applied to the operation lever when an automobile or the like runs over the power feed connector, and there is concern that the operation lever will be deformed.

The present invention has been made in consideration of the above-described circumstances, and an object thereof is to provide an inexpensive and highly durable power feed connector in which inconvenience can be prevented from occurring while being in use.

Means for Solving the Problems

In order to solve the above-described problems, according to an aspect of the present invention, a power feed connector, which is connected to a power receiving connector of an electromotive machine and supplies electric power to the electromotive machine, includes a tubular case that has a front end opening portion being open at a front end in a central axis direction and a rear end portion having an open hole formed at a rear end in the central axis direction, a connector main body that is accommodated inside the tubular case and is slidable in the central axis direction, an operation lever portion that has a first end being disposed inside the tubular case and a second end protruding outward through the open hole and being positioned on an inner side from both end portions of the tubular case in a width direction and is turnably supported by the tubular case, a link mechanism that is directly connected to the connector main body and the operation lever portion and converts a turning motion of the operation lever portion into a linear motion of the connector main body in the central axis direction, and a grip portion that is integrally provided with the tubular case and extends in a direction intersecting the central axis direction. The second end of the operation lever portion is disposed in the rear end portion of the tubular case at all times during the turning motion of the operation lever portion.

The connector main body may be movable between a retreated position and an advanced position which is positioned in front of the retreated position. The second end of the operation lever portion may be positioned near a central axis from an outer circumferential surface of the tubular case in a state where the operation lever portion is disposed at a position corresponding to the retreated position of the connector main body.

A pair of contact surfaces which face each other in a turning direction of the operation lever portion and with which the operation lever portion can come into contact may be formed on an inner circumferential surface of the open hole. When the operation lever portion comes into contact with the contact surfaces, movement of the connector main body in the central axis direction may be restricted.

The operation lever portion may further include an intermediate portion which is joined to the connector main body through the link mechanism. The first end of the operation lever portion may be turnably supported by the tubular case. The operation lever portion may be formed in a bent manner such that the second end is positioned on a rear side from the intermediate portion at all times during the turning motion of the operation lever portion.

The tubular case may further include a ridge portion which is formed on a circumferential edge of the open hole of the tubular case, protrudes from an outer surface of the tubular case, and surrounds the open hole. The operation lever portion may further include an open hole covering portion which covers the open hole and the ridge portion from the outer surface side of the tubular case.

The power feed connector may further include a display lamp that is provided in the rear end portion of the tubular case and is lit so as to issue notification of a state where electric power is supplied to the electromotive machine. The connector main body may move between the retreated position and the advanced position which is positioned in front of the retreated position. The operation lever portion may be disposed on the outer surface of the tubular case. The operation lever portion may further include a lamp covering portion which covers the display lamp in a state where the connector main body is disposed at the retreated position and exposes the display lamp to the outside of the tubular case in a state where the connector main body is disposed at the advanced position.

The operation lever portion may include two belt-like plate materials which are disposed so as to have a space therebetween in a rotation axis direction of the operation lever portion.

Effects of the Invention

According to the above-described aspect of the present invention, the connector main body and the operation lever portion are joined to each other by the link mechanism. Therefore, the force applied to the operation lever portion is directly transferred to the connector main body. Consequently, the motion of the connector main body follows the motion of the operation lever portion. Accordingly, compared to the configuration in the related art utilizing biasing device, even though the connector main body is moved by operating the operation lever portion, it is possible to prevent a shock with respect to the structure inside the tubular case including the connector main body. Therefore, there is no need for the structure inside the tubular case to be configured to be made from a member having high strength, and thus, the manufacturing cost can be prevented from increasing. In addition, the operation lever portion does not vigorously retreat due to the biasing device, and thus, a user can handle the power feed connector more safely.

In addition, the force applied to the operation lever portion is directly transferred to the connector main body, and the motion of the connector main body follows the motion of the operation lever portion. Accordingly, even in a case where the fitting force between the connector main body and the power receiving connector is significant, compared to the configuration in the related art utilizing the biasing device, a gear mechanism, or the like, the connector main body can be reliably drawn out from the power receiving connector by operating the operation lever portion.

In addition, the second end of the operation lever portion protrudes outward from the end portion of the tubular case on the rear side (the rear end portion) at all times during the turning motion of the operation lever portion and is positioned on an inner side from the end portion of the tubular case in the width direction. Accordingly, even in a case where the power feed connector is neglected on the ground and an automobile or the like runs over the power feed connector, stress is unlikely to be applied to the second end of the operation lever portion protruding to the outside of the tubular case, and thus, the operation lever portion can be prevented from being deformed.

Based on the facts described above, according to the aspect of the present invention, it is possible to prevent an occurrence of operational inconvenience and to provide a power feed connector which is inexpensive and highly durable.

EMBODIMENTS FOR CARRYING OUT THE INVENTION

Hereinafter, a power feed connector according to an embodiment of the present invention will be described with reference to FIGS. 1 to 5.

Figure 1:
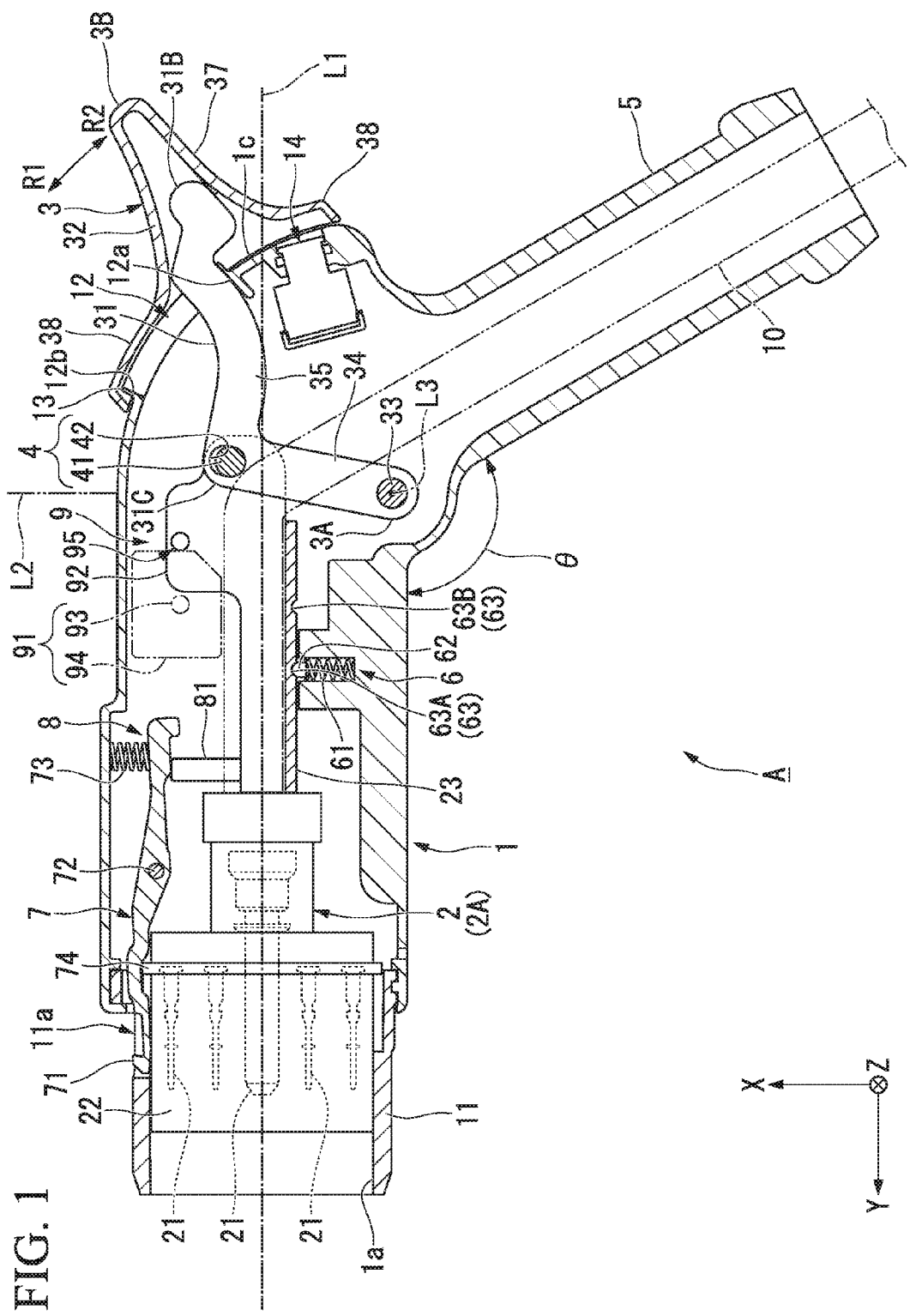
FIG. 1 is a side sectional view showing a power feed connector of an embodiment of the present invention.
Figure 2:
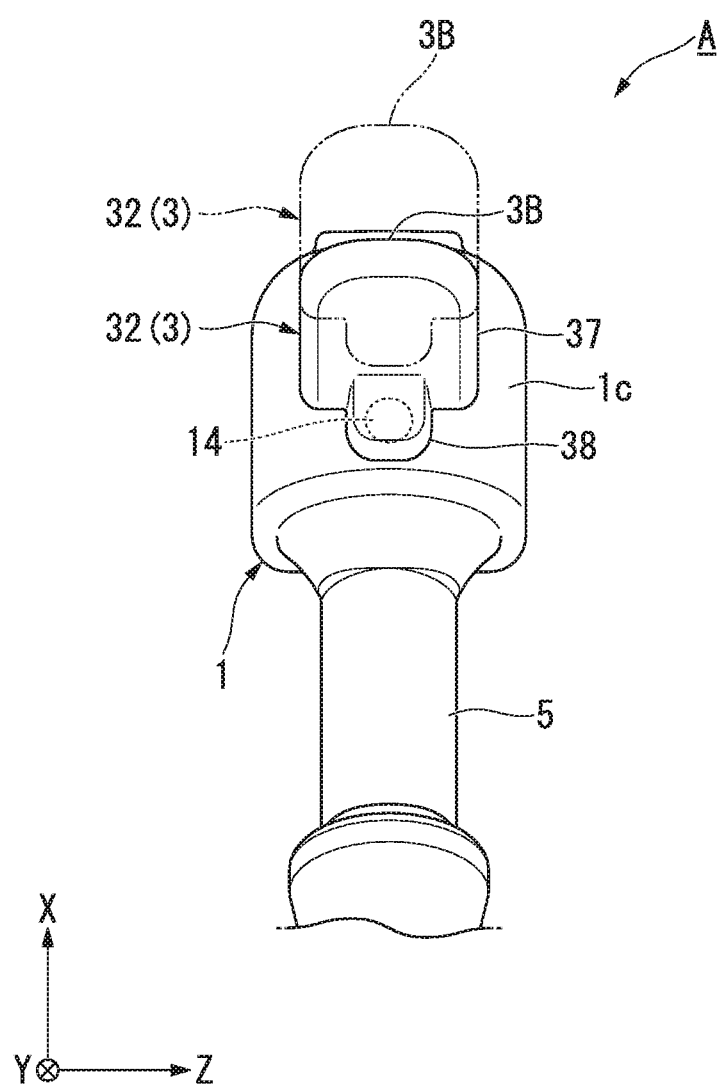
FIG. 2 is a rear view of the power feed connector in FIG. 1 viewed on the rear side of a tubular case.
Figure 3:
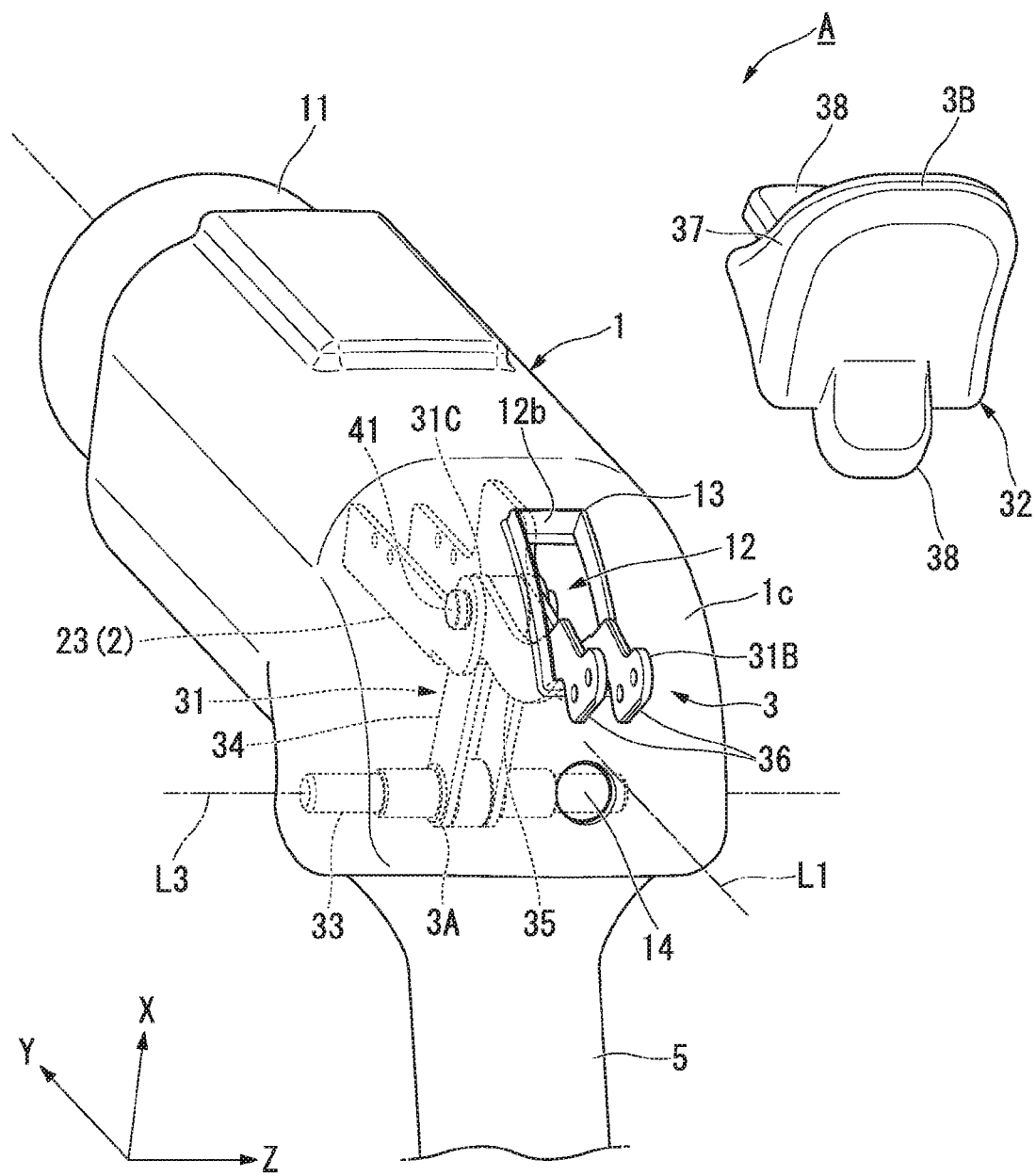
FIG. 3 is an exploded perspective view showing a state where a cover portion is detached from a lever main body in the power feed connector in FIG. 1.
Figure 4:
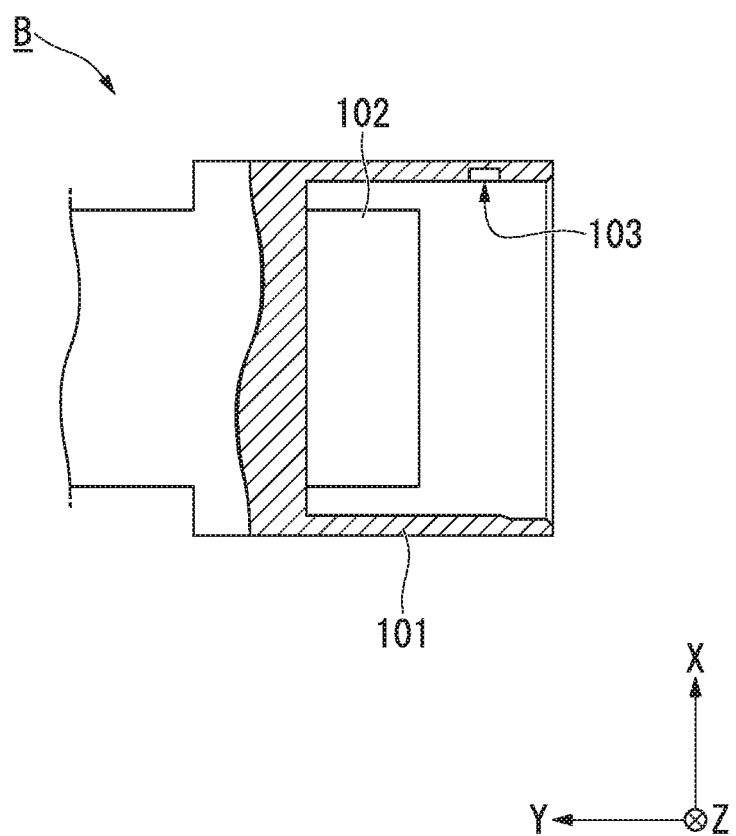
FIG. 4 is a side sectional view showing a power receiving connector to which the power feed connector in FIG. 1 is connected.
Figure 5:
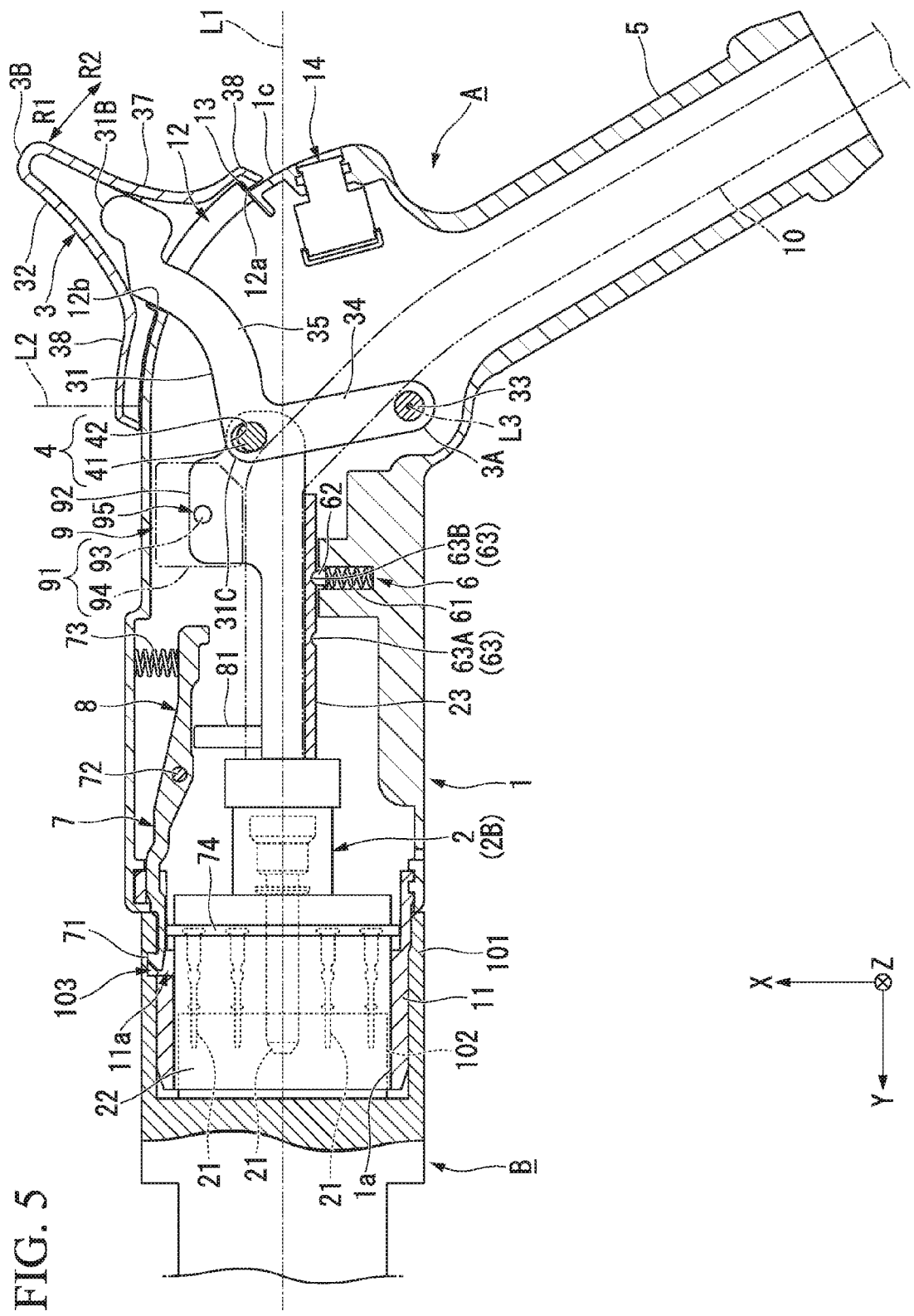
FIG. 5 is a side sectional view showing a state where the power feed connector in FIG. 1 is connected to the power receiving connector in FIG. 4.

As shown in FIGS. 1 to 3, a power feed connector A of the present embodiment is mounted in a charging apparatus which supplies electric power to an electric automobile (electromotive machine) in a charging station or the like. In addition, FIG. 4 shows a power receiving connector B which is provided in the electric automobile when electric power is suppled (when being charged). As shown in FIG. 5, the power feed connector A is connected to the power receiving connector B. In the description below, the Y-axis positive direction in each drawing may be referred to as the front and the Y-axis negative direction may be referred to as the rear. In addition, the X-axis positive direction may be referred to as the upward direction and the X-axis negative direction may be referred to as the downward direction. In addition, the Z-axis direction may be referred to as the width direction.

The power feed connector A includes a tubular case 1, a connector main body 2, an operation lever portion 3, a link mechanism 4, and a grip portion 5.

The tubular case 1 is formed to have a tubular shape and has a front end opening portion 1a which is open in an end portion thereof on the front side (front end portion) in a central axis L1 direction (Y-axis direction). An insertion portion 11 is provided in the front end portion of the tubular case 1, and the insertion portion 11 is inserted into a shell 101 of the power receiving connector B. An insertion hole 11a is formed in the surrounding wall of the insertion portion 11 such that the below-described latch claw 71 of a lock arm 7 is exposed to the outside of the insertion portion 11 in the radial direction.

The end portion of the tubular case 1 on the rear side (rear end portion) is a portion which has a surface facing the rear side of the tubular case, in the outer surface of the tubular case 1. In other words, the rear end portion of the tubular case 1 is a portion which is positioned on the rear side of the tubular case 1 from the end portion on the outer circumferential surface of the tubular case 1 on the rear side (the portion indicated by the boundary line L2 in FIG. 1).

An open hole 12 is formed in the rear end portion of the tubular case 1, and the open hole 12 is provided in order to cause the below-described second end 3B of the operation lever portion 3 to protrude outward. The open hole 12 of the present embodiment is formed at a position deviated toward the upper side of the tubular case 1 from a central axis L1. In addition, the open hole 12 is open on an inclined surface 1c in the rear end portion of the tubular case 1.

The inclined surface 1c inclines toward the lower side from a portion of the outer circumferential surface of the tubular case 1 (the outer circumferential surface of the tubular case 1 on the upper side in FIG. 1) to the rear. In addition, the inclined surface 1c is curved and has an arc-shaped section such that an inclination angle of the inclined surface 1c with respect to the Y-axis direction gradually increases toward the rear. Moreover, the inclined surface 1c is formed in an arc having the below-described rotation axis L3 of the operation lever portion 3 as the center.

In addition, the inclined surface 1c extends to the lower side of the tubular case 1 over the central axis L1. However, the inclined surface 1c is formed on the upper side of the tubular case 1 from the rotation axis L3 of the operation lever portion 3. Accordingly, the inclined surface 1c faces upward to the rear side of the tubular case 1.

A ridge portion 13 is formed on the circumferential edge of the open hole 12. The ridge portion 13 protrudes from the outer surface (the inclined surface 1c) of the tubular case 1 and surrounds the open hole 12. The ridge portion 13 of the present embodiment is formed such that the inner circumferential surface of the open hole 12 extends in a penetration direction (upward to the rear) of the open hole 12.

Moreover, a display lamp 14 such as an LED or the like is provided in the rear end portion of the tubular case 1. The display lamp 14 notifies a user (worker) or the like performing charging work of a state where electric power is supplied to an electric automobile, by being lit. That is, the display lamp 14 is set to be lit when being charged and to be turned off when charging is completed or when being in a non-charging state.

In the present embodiment, the display lamp 14 exposed to the outside from the inclined surface 1c in the rear end portion of the tubular case 1. Accordingly, the user or the like can visually recognize the display lamp 14 from the rear side of the tubular case 1. In addition, the display lamp 14 is disposed at a position deviated downward from the open hole 12, in the inclined surface 1c.

The grip portion 5 is integrally provided with the tubular case 1 and extends in a direction intersecting the central axis L1 direction of the tubular case 1 from the tubular case 1 (outward from the tubular case 1). It is favorable that the extension direction of the grip portion 5 is set such that an inclination angle θ with respect to the Y-axis positive direction ranges from 90 degrees to less than 180 degrees, for example. It is more preferable that the inclination angle θ of the grip portion 5 ranges from 100 degrees to 140 degrees, for example.

In the present embodiment, the grip portion 5 is formed to have a tubular shape and is provided on the lower side of the rear end portion of the tubular case 1. That is, the grip portion 5 is positioned on a side opposite to the open hole 12 on the basis of the central axis L1. In addition, the internal space of the grip portion 5 communicates with the internal space of the tubular case 1. The grip portion 5 of the present embodiment is integrally formed with the tubular case 1. However, the grip portion 5 may be fixed to the tubular case 1 while being formed separately from the tubular case 1, for example.

The connector main body 2 is accommodated inside the tubular case 1 while being slidable in the central axis L1 direction of the tubular case 1.

The connector main body 2 includes a plurality of power feeding side terminals (the terminals) 21, a tubular terminal storage portion 22, and a cable storage portion 23. The power feeding side terminals (the terminals) 21 are electrically connected to the power receiving connector B. The tubular terminal storage portion 22 stores the plurality of power feeding side terminals 21. The cable storage portion 23 stores a cable 10 which is connected to the proximal ends of the power feeding side terminals 21. In addition, the cable 10 is disposed so as to pass through the inside of the grip portion 5 from the power feeding side terminals 21 side and to extend outward from the power feed connector A.

In the power feeding side terminals 21, in addition to a power feed terminal for supplying electric power to an electric automobile, for example, a communication terminal for performing communication of information which is necessary in charge control between the charging apparatus and the electric automobile, and the like are included. The terminal storage portion 22 is mainly disposed inside the insertion portion 11 of the tubular case 1 when the connector main body 2 moves in the central axis L1 direction. The end portion of the terminal storage portion 22 on the front side is open such that the distal ends of the power feeding side terminals 21 can be connected to the external power receiving connector B inside the front end opening portion 1a of the tubular case 1.

It is possible to arbitrarily set the specific number and disposition of various types of terminals such as the power feeding side terminals 21 and the like, a specific shape of the terminal storage portion 22, a shape of the above-described insertion portion 11 of the tubular case 1, and the like. For example, it is possible to enumerate the contents defined by "Japan Electric Vehicle Standard: JEVS G 105".

The cable storage portion 23 is disposed on the rear side from the terminal storage portion 22 and is fixed to the end portion of the terminal storage portion 22 on the rear side. As shown in FIG. 3, in order to be able to store the cable 10, the cable storage portion 23 is formed by bending a plate material so as to have a C-shape in a cross section orthogonal to the central axis L1 direction. The shape of the cable storage portion 23 is not limited thereto.

In order to cause the above-described connector main body 2 to freely move with respect to the tubular case 1 in the central axis L1 direction, it is possible to adopt the known sliding mechanism in the related art. As the known sliding mechanism in the related art, for example, a rail portion which is formed in one of the tubular case 1 and the connector main body 2 and extends in the central axis L1 direction, and a sliding groove portion which is formed in the other of the tubular case 1 and the connector main body 2 and extends in the central axis L1 direction so that the rail portion is inserted therein may be adopted.

The power feed connector A of the present embodiment includes a positioning mechanism 6 which performs positioning of the above-described connector main body 2 with respect to the tubular case 1. The positioning mechanism 6 includes a coil spring 61, a spherical ball plunger 62, and recessed portions 63. The coil spring 61 biases the ball plunger 62 toward the cable storage portion 23 from the inner circumferential surface side of the tubular case 1. Two recessed portions 63 are formed on the facing surface of the cable storage portion 23 facing the ball plunger 62.

The two recessed portions 63 are arranged so as to have a space therebetween in the central axis L1 direction. The inner surface of each of the recessed portions 63 is formed to have an arc shape so as to correspond to the spherical surface of the ball plunger 62, and a portion of the ball plunger 62 enters each of the recessed portions 63. In a state where the ball plunger 62 enters the recessed portion 63, movement of the connector main body 2 with respect to the tubular case 1 is restricted. However, in a case where force of moving the connector main body 2 in the central axis L1 direction is greater than a predetermined value, the connector main body 2 can be moved in the central axis L1 direction against the biasing force of the coil spring 61.

A first recessed portion 63A in the two recessed portions 63 is positioned on the front side. As shown in FIG. 1, in a state where the ball plunger 62 enters the first recessed portion 63A, the connector main body 2 is disposed at a position (retreated position 2A) on the rear side of the tubular case 1. In this state, even though the insertion portion 11 is put into the power receiving connector B, the power feeding side terminals 21 are disposed away from the terminal of the power receiving connector B.

Meanwhile, a second recessed portion 63B in the two recessed portions 63 is positioned on the rear side. As shown in FIG. 5, in a state where the ball plunger 62 enters the second recessed portion 63B, the connector main body 2 is disposed at a position (advanced position 2B) on the front side of the tubular case 1. In this state, when the insertion portion 11 is put into the power receiving connector B, the power feeding side terminals 21 are connected to the terminal of the power receiving connector B.

That is, the positioning mechanism 6 plays a role in positioning the connector main body 2 at the retreated position 2A and the advanced position 2B described above.

The operation lever portion 3 operates movement of the connector main body 2 in the central axis L1 direction and is turnably supported by the tubular case 1.

A first end 3A side of the operation lever portion 3 in the longitudinal direction is disposed inside the tubular case 1. The second end 3B of the operation lever portion 3 protrudes outward through the open hole 12 of the tubular case 1. In addition, as shown in FIGS. 1 and 5, the second end 3B of the operation lever portion 3 is disposed in the rear end portion of the tubular case 1 (a portion on the rear side of the tubular case 1 from the boundary line L2) regardless of the turning position of the operation lever portion 3 (at all times during the turning motion of the operation lever portion 3). In addition, the second end 3B of the operation lever portion 3 is positioned on an inner side from both the end portions of the tubular case 1 in the width direction (particularly, refer to FIG. 2). The width direction of the tubular case 1 is a direction orthogonal to a virtual plane which is configured to be in the central axis L1 direction and the extending direction of the grip portion 5.

Hereinafter, the operation lever portion 3 of the present embodiment will be described in detail.

The operation lever portion 3 includes a lever main body 31 and a cover portion 32 which is integrally provided with a second end 31B of the lever main body 31 protruding outward through the open hole 12 of the tubular case 1 and is disposed on the outer surface of the tubular case 1 (mainly, on the inclined surface 1c).

The lever main body 31 turnably supported by a lever shaft 33 in the tubular case 1. In the present embodiment, a first end of the lever main body 31 forming a first end 3A of the operation lever portion 3 in the longitudinal direction is turnably supported by the lever shaft 33 in the tubular case 1. A direction of the axial line of the lever shaft 33 (the rotation axis L3 of the operation lever portion 3) extends in the width direction of the tubular case 1 and is orthogonal to the central axis L1 direction. However, the rotation axis L3 is positioned so as to deviate toward the lower side from the central axis L1 and does not intersect the central axis L1. Meanwhile, the second end 31B of the lever main body 31 in the longitudinal direction protrudes outward through the open hole 12. Therefore, the second end 31B thereof is positioned on the upper side from the central axis L1.

An intermediate portion 31C of the lever main body 31 is directly connected to the rear end portion of the connector main body 2 (the cable storage portion 23) by the link mechanism 4. In addition, the lever main body 31 is formed in a bent manner such that the second end 31B of the lever main body 31 is positioned on the rear side of the tubular case 1 from the intermediate portion 31C regardless of the turning position of the lever main body 31 (at all times during the turning motion of the lever main body 31). In the present embodiment, the lever main body 31 is bent at the intermediate portion 31C.

More specifically, the lever main body 31 includes a first arm portion 34 which extends from the first end thereof to the intermediate portion 31C, and a second arm portion 35 which extends from the intermediate portion 31C to the second end 31B. The first arm portion 34 linearly extends in a direction away from the lever shaft 33 (the rotation axis L3). Meanwhile, the second arm portion 35 is bent with respect to the first arm portion 34 so as to extend toward the rear side of the tubular case 1. In addition, the second arm portion 35 is formed in a curved manner so as to protrude through the open hole 12 of the tubular case 1 in a direction orthogonal to the inclined surface 1c having an arc-shaped section. Moreover, the second arm portion 35 is formed in a bent manner such that the distal end portion of the second arm portion 35 positioned outside the tubular case 1 is positioned on the rear side of the tubular case 1 from a portion of the second arm portion 35 positioned inside the open hole 12. The distal end portion of the second arm portion 35 forms the second end 31 B of the lever main body 31.

The lever main body 31 having the above-described configuration may be configured to have two belt-like plate materials 36 which are disposed so as to have a space therebetween in the width direction of the tubular case 1 and are fixed to each other as shown in FIG. 3, for example. Each of the belt-like plate materials 36 has the above-described configuration of the lever main body 31. For example, the two belt-like plate materials 36 are integrally fixed to each other via the lever shaft 33.

The cover portion 32 is disposed on the outer surface of the tubular case 1 (mainly, on the inclined surface 1c) and covers the second end 31B of the lever main body 31 (the distal end portion of the second arm portion 35) protruding through the open hole 12. The cover portion 32 is fixed to the second end 31B of the lever main body 31 by a fastening screw or the like.

The cover portion 32 includes an extension portion 37. The extension portion 37 protrudes in the same direction as the protruding direction of the second end 31B of the lever main body 31 so as to cover the second end 31B of the lever main body 31. The distal end of the extension portion 37 in the extending direction becomes the second end 3B of the operation lever portion 3. The dimensions of the extension portion 37 in the extending direction are set such that the distal end of the extension portion 37 (the second end 3B of the operation lever portion 3) is positioned near the central axis L1 (inside the tubular case 1 in the radial direction) from the outer circumferential surface of the tubular case 1 in a state where the operation lever portion 3 is disposed at a position corresponding to the retreated position 2A of the connector main body 2 as shown in FIG. 1. The extension portion 37 is a portion which is grasped by a user when the operation lever portion 3 is operated.

When the user moves the second end 3B of the operation lever portion 3 from the central axis L1 side of the tubular case 1 toward the outer circumferential surface side, the connector main body 2 moves from the retreated position 2A to the advanced position 2B. On the contrary, when the user moves the second end 3B of the operation lever portion 3 from the outer circumferential surface side of the tubular case 1 to the central axis L1 side, the connector main body 2 moves from the advanced position 2B to the retreated position 2A.

In addition, the cover portion 32 includes a covering portion 38. The covering portion 38 is formed so as to extend in both turning directions R1 and R2 of the lever main body 31 with respect to the extension portion 37. Regardless of the turning position of the lever main body 31, the covering portion 38 functions as an open hole covering portion which covers the open hole 12 and the ridge portion 13 of the tubular case 1 from the outer surface side of the tubular case 1.

In addition, the covering portion 38 covers the display lamp 14 in a state where the connector main body 2 is disposed at the retreated position 2A. The covering portion 38 also functions as a lamp covering portion which exposes the display lamp to the outside of the tubular case 1 in a state where the connector main body 2 is disposed at the advanced position 2B.

In the operation lever portion 3 having the above-described configuration, the dimensions of the cover portion 32 along the tubular case 1 in the width direction are set to be smaller than the width dimension of the tubular case 1. Accordingly, as shown in FIG. 2, the operation lever portion 3 is positioned on an inner side from both the end portions of the tubular case 1 in the width direction.

In addition, the open hole 12 of the tubular case 1 allowing the lever main body 31 to be inserted therethrough is formed on the inclined surface 1c of the tubular case 1 facing the rear side, and the extension portion 37 of the cover portion 32 extends in a direction orthogonal to the inclined surface 1c. Accordingly, the extension portion 37 of the cover portion 32 (the second end 3B of the operation lever portion 3) is disposed in the rear end portion of the tubular case 1 regardless of the turning position of the lever main body 31.

Moreover, the second end 3B of the operation lever portion 3 having the above-described configuration is positioned on the inclined surface 1c facing upward to the rear side of the tubular case 1. Accordingly, the movement direction of the second end 3B of the operation lever portion 3 becomes the upward-downward direction (the X-axis direction) of the tubular case 1 when viewed from the rear side of the tubular case 1. In addition, the movement direction of the second end 3B of the operation lever portion 3 becomes the forward-rearward direction (the Y-axis direction) of the tubular case 1 when viewed from the upper side of the tubular case 1.

The link mechanism 4 is directly connected to the connector main body 2 and the operation lever portion 3 and converts a turning motion of the operation lever portion 3 into a linear motion of the connector main body 2. The link mechanism 4 of the present embodiment includes a joining pin 41 which is formed in the rear end portion (the cable storage portion 23) of the connector main body 2, and a long hole 42 which is formed in the operation lever portion 3 and allows the joining pin 41 to be inserted therein.

The joining pin 41 extends in a direction parallel to the rotation axis L3 of the operation lever portion 3. Meanwhile, the long hole 42 is formed in the intermediate portion 31C of the lever main body 31 and extends in a direction orthogonal to the rotation axis L3 of the operation lever portion 3 (the longitudinal direction of the first arm portion 34). Accordingly, the joining pin 41 is freely movable inside the long hole 42 in the longitudinal direction of the long hole 42.

According to the above-described configuration of the link mechanism 4, when the operation lever portion 3 is turned in the first turning direction R1 in a state where the connector main body 2 is disposed at the retreated position 2A, the long hole 42 formed in the operation lever portion 3 turns centering around the rotation axis L3. In the present example, the long hole 42 moves upward to the front at the initial stage due the turning centering around the rotation axis L3. Thereafter, the long hole 42 moves downward to the front. In this case, the long hole 42 which is inserted into the joining pin 41 is movable in the longitudinal direction of the long hole 42, and the connector main body 2 is slidable in only the central axis L1 direction (the forward-rearward direction). Therefore, the joining pin 41 formed in the connector main body 2 moves the connector main body 2 in the forward direction while moving inside the long hole 42 in the longitudinal direction of the long hole 42 due to the turning. Accordingly, the connector main body 2 can be moved from the retreated position 2A to the advanced position 2B.

In addition, when the operation lever portion 3 is turned in the second turning direction R2 in a state where the connector main body 2 is disposed at the advanced position 2B, the long hole 42 moves upward to the rear at the initial stage due to the turning centering around the rotation axis L3. Thereafter, the long hole 42 moves downward to the rear. The joining pin 41 moves the connector main body 2 in the rearward direction while moving inside the long hole 42 in the longitudinal direction of the long hole 42 due to the turning. Accordingly, the connector main body 2 can be moved from the advanced position 2B to the retreated position 2A.

That is, by the link mechanism 4, a turning motion of the operation lever portion 3 (force of turning the operation lever portion 3) can be converted into a linear motion of the connector main body 2 (force of moving the connector main body 2 in the central axis L1 direction).

In the present embodiment, the dimensions of the long hole 42 in the longitudinal direction are set to be longer than the movement distance of the joining pin 41 inside the long hole 42. In this manner, the joining pin 41 does not come into contact with both ends of the long hole 42 in the longitudinal direction when the connector main body 2 is moved between the retreated position 2A and the advanced position 2B.

Since the operation lever portion 3 and the link mechanism 4 have the above-described configurations, in the power feed connector A of the present embodiment, when the operation lever portion 3 is turned in the first turning direction RI in a state shown in FIG. 1, the connector main body 2 moves toward the front side of the tubular case 1 from the retreated position 2A to the advanced position 2B. In this case, it seems like the second end 313 of the operation lever portion 3 moves toward the front side of the tubular case 1 when viewed from the upper side of the tubular case 1. On the contrary, in a state shown in FIG. 5, when the operation lever portion 3 is turned in the second turning direction R2, the connector main body 2 moves toward the rear side of the tubular case 1 from the advanced position 213 to the retreated position 2A. In this case, it seems like the second end 3B of the operation lever portion 3 moves toward the rear side of the tubular case 1 when viewed from the upper side of the tubular case 1.

That is, in the power feed connector A of the present embodiment, the movement directions of the second end 3B of the operation lever portion 3 and the connector main body 2 can coincide with each other.

The movement in the central axis L1 direction of the connector main body 2 which is joined to the operation lever portion 3 as described above is restricted by the open hole 12 of the tubular case 1 allowing the operation lever portion 3 to be inserted therethrough.

Specifically, a pair of contact surfaces 12a and 12b which face each other in the turning direction of the operation lever portion 3 and with which the operation lever portion 3 (the second arm portion 35) can come into contact are formed on the inner circumferential surface of the open hole 12. For example, the distance between the pair of contact surfaces 12a and 12b along the turning direction of the operation lever portion 3 (the dimensions of the open hole 12 along the turning direction) is set so as to correspond to the turning distance of the operation lever portion 3 in response to the movement distance of the connector main body 2 from the retreated position 2A (refer to FIG. 1) to the advanced position 213 (refer to FIG. 5).

Accordingly, for example, in a state where the connector main body 2 is disposed at the retreated position 2A as shown in FIG. 1, the operation lever portion 3 (the second arm portion 35) is disposed at a position being in contact with the first contact surface 12a or disposed while having a minute space with respect to the first contact surface 12a. Meanwhile, for example, in a state where the connector main body 2 is disposed at the advanced position 2B as shown in FIG. 5, the operation lever portion 3 (the second arm portion 35) is disposed at a position being in contact with the second contact surface 12b or disposed while having a minute space with respect to the second contact surface 12b. That is, in the present embodiment, due to the pair of contact surfaces 12a and 12b of the open hole 12, the movement range of the connector main body 2 is restricted so as not to deviate from the range from the retreated position 2A (refer to FIG. 1) to the advanced position 2B (refer to FIG. 5). Accordingly, even though a user intends to operate the operation lever portion 3 with excessive force, the force does not reach the link mechanism 4 inside the tubular case 1, and thus, breakage thereof can be prevented.

Moreover, the power feed connector A of the present embodiment includes the lock arm 7 which is provided on the front end portion side of the tubular case 1 and causes the power feed connector A to engage with the power receiving connector B as shown in FIGS. 1 and 5.

The lock arm 7 is formed to have a rod shape extending in the central axis L1 direction. The latch claw 71 protruding to the outside of the tubular case 1 in the radial direction is formed in the front end portion of the lock arm 7. In addition, an intermediate portion of the lock arm 7 is turnably supported by a pin 72 in the tubular case 1. That is, the lock arm 7 is attached to the tubular case 1 so as to be able to oscillate. In addition, between the tubular case 1 and the lock arm 7, there is provided a coil spring 73 which urges the lock arm 7 in a first oscillation direction such that the latch claw 71 of the lock arm 7 protrudes to the outside of the tubular case 1. In the present embodiment, only one lock arm 7 is provided. However, without being limited thereto, for example, multiple lock arms 7 may be provided. In this case, the multiple lock arms 7 may be arranged in the circumferential direction of the tubular case 1 so as to surround the connector main body 2.

Moreover, in the connector main body 2, in a state where the connector main body 2 is disposed at the advanced position 2B, a support projection 74 which supports the above-described front end portion of the lock arm 7 from the inside of the tubular case 1 is formed. The support projection 74 protrudes from the outer circumferential surface of the terminal storage portion 22 of the connector main body 2. In FIGS. 1 and 5, the support projection 74 is formed across the entirety of the terminal storage portion 22 in the circumferential direction. However, without being limited thereto, in a state where at least the connector main body 2 is disposed at the advanced position 2B, the support projection 74 may be formed in a region of the terminal storage portion 22 in the outer circumferential surface facing the front end portion of the lock arm 7. The support projection 74 prevents the latch claw 71 of the lock arm 7 from retreating into the tubular case 1 due to unintended external force or the like, in a state where the connector main body 2 is disposed at the advanced position 2B.

Moreover, the power feed connector A of the present embodiment includes an unlocking mechanism 8 which causes the latch claw 71 of the lock arm 7 to retreat into the tubular case 1 against the biasing force of the coil spring 73. The unlocking mechanism 8 of the present embodiment includes an arm pressing portion 81 which is provided in the connector main body 2 and presses the rear end portion of the lock arm 7 to the outside of the tubular case 1 in the radial direction against the biasing force of the coil spring 73.

The arm pressing portion 81 is formed so as to protrude from the connector main body 2 to the outside of the tubular case 1. The arm pressing portion 81 is positioned on the front side of the tubular case 1 from the rear end portion of the lock arm 7 and does not come into contact with the rear end portion of the lock arm 7 in a state where the connector main body 2 is disposed at the advanced position 2B (refer to FIG. 5). Meanwhile, in a state where the connector main body 2 is disposed at the retreated position 2A (refer to FIG. 1), the arm pressing portion 81 bumps into the rear end portion of the lock arm 7, thereby being in contact with the rear end portion thereof. Accordingly, the arm pressing portion 81 presses the rear end portion of the lock arm 7 to the outside of the tubular case 1 in the radial direction against the biasing force of the coil spring 73. As a result, the latch claw 71 of the lock arm 7 retreats into the tubular case 1.

In addition, the power feed connector A of the present embodiment includes an electromagnetic locking mechanism 9 which prevents the connector main body 2 from moving with respect to the tubular case 1 when being charged. The electromagnetic locking mechanism 9 includes a solenoid 91 which is provided in the tubular case 1, and a lock portion 92 which is provided in the connector main body 2 and has an interlocking hole 95 allowing a plunger 93 of the solenoid 91 to be inserted therethrough. The lock portion 92 of the present embodiment is integrally formed with the cable storage portion 23 of the connector main body 2. However, without being limited thereto, for example, a member independent from the connector main body 2 may be fixed to the connector main body 2.

The plunger 93 of the solenoid 91 is accommodated inside the electromagnet 94 in a state where no current flows in an electromagnet 94 of the solenoid 91, and the plunger 93 thereof protrudes in the Z-axis direction, for example, from the electromagnet 94 in a state where a current flows in the electromagnet 94. Electric power is supplied to the electromagnet 94 when being charged.

The lock portion 92 is disposed at a position where the plunger 93 protruding from the electromagnet 94 can be inserted through the interlocking hole 95 in a state where the connector main body 2 is disposed at the advanced position 2B (refer to FIG. 5).

Meanwhile, in a state where the connector main body 2 is disposed at the retreated position 2A (refer to FIG. 1), the interlocking hole 95 of the lock portion 92 is positioned so as to deviate with respect to the plunger 93. Therefore, even if the plunger 93 protrudes from the electromagnet 94, there is no chance of it being inserted through the interlocking hole 95.

The power receiving connector B which is connected to the power feed connector A having the above-described configuration is fixed to the vehicle body or the like of an electric automobile. As shown in FIGS. 4 and 5, the power receiving connector B includes the tubular shell 101 which receives the insertion portion 11 of the tubular case 1, a tubular terminal storage portion 102 which is provided inside the shell 101, and power receiving terminals (not shown) which is disposed inside the terminal storage portion 102. In a state where the insertion portion 11 of the tubular case 1 is put into the shell 101, the terminal storage portion 102 is put into the terminal storage portion 22 of the connector main body 2. That is, the shapes of the shell 101 and the terminal storage portion 102 respectively correspond to the insertion portion 11 and the terminal storage portion 22 of the power feed connector A. A recessed engagement portion 103 which is interlocked with the latch claw 71 of the power feed connector A is formed on the inner circumferential surface of the shell 101.

The power receiving terminals electrically connect the power feed connector A and the power receiving connector B by coming into contact with or bumping into the power feeding side terminals 21 of the power feed connector A, thereby playing the same role as the power feeding side terminals 21. That is, the number and disposition of the power receiving terminals correspond to the number and disposition of the power feeding side terminals 21 of the power feed connector A.

Subsequently, a method of using the power feed connector A of the present embodiment will be described.

In a case where the power feed connector A is connected to the power receiving connector B, first, the connector main body 2 is disposed at the retreated position 2A as shown in FIG. 1. In this state, a user grasps the grip portion 5, inserts the front end portion (the insertion portion 11) of the tubular case 1 into the shell 101, and puts the front end portion thereof into the power receiving connector B. In this state, the power feeding side terminals 21 of the power feed connector A and the power receiving terminals of the power receiving connector B are separated from each other.

Subsequently, the user grasps the second end 3B (the extension portion 37) of the operation lever portion 3 and turns the operation lever portion 3 in the first turning direction R1. Accordingly, the connector main body 2 moves to the front side of the tubular case 1 and is disposed at the advanced position 2B as shown in FIG. 5. In addition, the covering portion 38 of the operation lever portion 3 is separated from the top of the display lamp 14, and the display lamp 14 is exposed to the outside of the tubular case 1.

In this state, in accordance with the above-described operation of the operation lever portion 3, the arm pressing portion 81 of the unlocking mechanism 8 moves together with the connector main body 2 and is separated from the rear end portion of the lock arm 7. Accordingly, the latch claw 71 of the lock arm 7 protrudes outward from the insertion hole 11a of the tubular case 1 due to the biasing force of the coil spring 73, thereby being interlocked with the recessed engagement portion 103 of the power receiving connector B.

Therefore, the power feed connector A is in a state of being fitted with the power receiving connector B. In addition, since the front end portion of the lock arm 7 including the latch claw 71 is supported by the support projection 74 from the inside in the radial direction, the fitted state between the power feed connector A and the power receiving connector B can be maintained.

Moreover, in this state, the power feeding side terminals 21 come into contact with or bump into the power receiving terminals so that the power feed connector A and the power receiving connector B are electrically connected to each other, thereby being in a chargeable state. More specifically, when the operation lever portion 3 is turned in the first turning direction R1, after the latch claw 71 of the lock arm 7 is interlocked with the recessed engagement portion 103 of the power receiving connector B, the power feed connector A and the power receiving connector B are electrically connected to each other.

When charging starts while being in the above-described fitted state, a current flows in the electromagnet 94 of the solenoid 91, and the plunger 93 is inserted into the interlocking hole 95 of the lock portion 92. That is, the electromagnetic locking mechanism 9 prevents the connector main body 2 from moving. Therefore, it is possible to reliably prevent the power feeding side terminals 21 of the power feed connector A and the power receiving terminals of the power receiving connector B from being separated from each other when being charged. In addition, when charging starts, the display lamp 14 is lit, thereby notifying a user of the fact that electric power is supplied to the electric automobile.

When charging is completed, electric power stops being supplied to the electromagnet 94. Accordingly, the plunger 93 of the solenoid 91 is drawn out from the interlocking hole 95 of the lock portion 92. That is, the connector main body 2 is in a movable state. In addition, in this case, the user is notified of the fact that the display lamp 14 is turned off and charging is completed.

Thereafter, in a case where the power feed connector A is detached from the power receiving connector B, first, the user grasps the second end 3B (the extension portion 37) of the operation lever portion 3 and turns the operation lever portion 3 in the second turning direction R2. Accordingly, as shown in FIG. 1, the connector main body 2 moves to the rear side of the tubular case 1 and is disposed at the retreated position 2A. In addition, the covering portion 38 of the operation lever portion 3 is disposed on the top of the display lamp 14. That is, the display lamp 14 is covered by the covering portion 38.

In this state, in accordance with the above-described operation of the operation lever portion 3, the arm pressing portion 81 of the unlocking mechanism 8 moves together with the connector main body 2 and comes into contact with the rear end portion of the lock arm 7. Accordingly, the arm pressing portion 81 presses the rear end portion of the lock arm 7 to the outside of the tubular case 1 in the radial direction against the biasing force of the coil spring, and the latch claw 71 of the lock arm 7 retreats into the tubular case I. That is, the fitted state between the power feed connector A and the power receiving connector B is cancelled.

Thereafter, the grip portion 5 is grasped and the power feed connector A is drawn out from the power receiving connector B, thereby ending the work of detaching the power feed connector A.

As described above, according to the power feed connector A of the present embodiment, the connector main body 2 and the operation lever portion 3 are joined to each other by the link mechanism 4. Therefore, the force applied to the operation lever portion 3 is directly transferred to the connector main body 2, and the motion of the connector main body 2 follows the motion of the operation lever portion 3. Accordingly, compared to the configuration in the related art utilizing a biasing mechanism, when the connector main body 2 is moved to the rear by operating the operation lever portion 3, it is possible to prevent a shock from being applied to the structure inside the tubular case 1 including the connector main body 2. Therefore, there is no need for the structure inside the tubular case 1 to be configured to be made from a member having high strength, and thus, the manufacturing cost of the power feed connector A can be prevented from increasing. In addition, the operation lever portion 3 does not vigorously retreat due to the biasing mechanism, and thus, a user can handle the power feed connector more safely.

In addition, since the force applied to the operation lever portion 3 is directly transferred to the connector main body 2 and the motion of the connector main body 2 follows the motion of the operation lever portion 3, compared to the configuration in the related art utilizing the biasing mechanism, in accordance with the magnitude of the fitting force between the connector main body 2 and the power receiving connector B, a user can operate the operation lever portion 3 by freely controlling the force applied to the operation lever portion 3.

In addition, since the force applied to the operation lever portion 3 is directly transferred to the connector main body 2 and the motion of the connector main body 2 follows the motion of the operation lever portion 3, even though the fitting force between the connector main body 2 and the power receiving connector B is significant, compared to the configuration in the related art utilizing the biasing mechanism or a gear mechanism, the connector main body 2 can be reliably drawn out from the power receiving connector B by operating the operation lever portion 3.

Moreover, according to the simple structure in which the link mechanism 4 causes the connector main body 2 and the operation lever portion 3 to be directly joined to each other, it is possible to easily realize the miniaturization of the power feed connector A.

In addition, according to the power feed connector A of the present embodiment, the second end 3B (the extension portion 37) of the operation lever portion 3 protrudes outward from the rear end portion of the tubular case 1 regardless of the turning position of the operation lever portion 3, and the second end 3B thereof is positioned on an inner side from the end portion of the tubular case 1 in the width direction. Accordingly, even though the power feed connector A is neglected on the ground and an automobile or the like runs over the power feed connector A, stress is unlikely to be applied to the second end 3B (the extension portion 37) of the operation lever portion 3 protruding to the outside of the tubular case 1, and thus, the operation lever portion 3 can be prevented from being deformed.

Specifically, the power feed connector A is disposed on the ground in the most stable state by bringing both the end portion of the tubular case 1 in the width direction and the grip portion 5 into contact with the ground such that the width direction of the tubular case 1 is oriented in the approximately vertical direction. In such a disposition state (neglected state), the second end 3B (the extension portion 37) of the operation lever portion 3 does not protrude upward in the vertical direction from the tubular case 1 and does not come into contact with the ground as well. Accordingly, even though an automobile or the like runs over the power feed connector A, stress is prevented from being applied to the operation lever portion 3.

Moreover, according to the power feed connector A of the present embodiment, in a state where the connector main body 2 is disposed at the retreated position 2A, the second end 3B (the extension portion 37) of the operation lever portion 3 is positioned on the central axis L1 side (inside in the radial direction) from the outer circumferential surface of the tubular case 1. Accordingly, even though an automobile or the like runs over the power feed connector A which is neglected on the ground, the operation lever portion 3 can be further prevented from being in contact with the automobile or the like. As described in the present embodiment, in a state where the power feed connector A is detached from the power receiving connector B, the connector main body 2 is disposed at the retreated position 2A. Therefore, it is greatly useful when the second end 3B of the operation lever portion 3 is positioned inside the tubular case 1 in the radial direction as described above.

In addition, according to the power feed connector A of the present embodiment, the pair of contact surfaces 12a and 12b with which the operation lever portion 3 comes into contact is formed in the open hole 12 of the tubular case 1. Accordingly, in a state where the operation lever portion 3 is turned in any one of the turning directions and comes into contact with the contact surfaces 12a and 12b of the open hole 12, even though a user intends to turn the operation lever portion 3 farther in the same turning direction, the force of turning the operation lever portion 3 is received by the contact surfaces 12a and 12b. Accordingly, the force which compulsorily turns the operation lever portion 3 is transferred to the connector main body 2, a joining portion between the connector main body 2 and the operation lever portion 3, or the like, and thus, stress can be prevented from occurring therein. That is, it is possible to realize the protection of the structure of the connector main body 2 and the like disposed inside the tubular case 1.

Moreover, according to the power feed connector A of the present embodiment, the first end 3A of the operation lever portion 3 is pivotally supported by the tubular case 1, and the intermediate portion of the operation lever portion 3 (the intermediate portion 31 C of the lever main body 31) is directly connected to the connector main body 2 by the link mechanism 4. Accordingly, the movement direction of the operation lever portion 3 can coincide with the movement direction of the connector main body 2, and thus, a user can intuitionally operate the operation lever portion 3.

In addition, according to the power feed connector A of the present embodiment, the operation lever portion 3 is formed in a bent manner such that the second end 3B of the operation lever portion 3 is positioned on the rear side of the tubular case 1 from the intermediate portion 31C regardless of the turning position of the operation lever portion 3. Accordingly, the second end 313 of the operation lever portion 3 can be reliably disposed in the rear end portion of the tubular case 1.

Moreover, in the power feed connector A of the present embodiment, the ridge portion 13 is formed at the circumferential edge of the open hole 12 of the tubular case 1, and the open hole 12 and the ridge portion 13 are covered by the covering portion 38 of the operation lever portion 3 disposed on the outer surface (the inclined surface 1c) of the tubular case. Accordingly, water can be prevented from flowing on the outer surface of the tubular case 1 and entering the inside of the covering portion 38. In addition, even if water enters the inside of the covering portion 38, water can be inhibited from entering the inside of the open hole 12 by the ridge portion 13. Therefore, it is possible to effectively prevent water from invading the inside of the tubular case 1 through the open hole 12 of the tubular case 1. Since the charging apparatus including the power feed connector A is often installed outside, it is greatly useful when invasion of water can be effectively prevented as described above.

In addition, according to the power feed connector A of the present embodiment, in a state where the connector main body 2 is disposed at the retreated position 2A, the display lamp 14 is covered by the covering portion 38 of the operation lever portion 3. Accordingly, it is possible to realize the protection of the display lamp 14. Moreover, since the display lamp 14 can be switched between the exposed state and the covered state by only moving the operation lever portion 3, it is possible to easily realize the protection of the display lamp 14 without increasing work while the power feed connector A is in use.

Moreover, since the switching between the exposed state and the covered state of the display lamp 14 is interconnected to the movement between the retreated position 2A and the advanced position 2B of the connector main body 2, the switching therebetween also contributes to calling for attention such as insufficient movement and the like of the connector main body 2 or the operation lever portion 3.

Moreover, according to the power feed connector A of the present embodiment, the lever main body 31 of the operation lever portion 3 is configured to be formed from the two belt-like plate materials 36 which are disposed so as to have a space therebetween in the rotation axis L3 direction. Accordingly, it is possible to realize the weight reduction as well while ensuring the rigidity of the operation lever portion 3. In addition, since the cable 10 connected to the power feeding side terminals 21 of the connector main body 2, various types of electrical wires necessary for the power feed connector A, and the like can pass between the two belt-like plate materials 36, it is possible to realize miniaturization of the tubular case 1 by effectively utilizing the space inside the tubular case 1.

Hereinbefore, the embodiment of the power feed connector according to the present invention has been described. However, the present invention is not limited to the above-described embodiment, and various changes can be added without departing from the gist and the scope of the present invention.

For example, in the above-described embodiment, the joining pin 41 of the link mechanism 4 is provided in the connector main body 2, and the long hole 42 of the link mechanism 4 is formed in the operation lever portion 3. However, the embodiment is not limited thereto. For example, the joining pin 41 may be provided in the operation lever portion 3 (the intermediate portion 31C of the lever main body 31), and the long hole 42 may be formed in the connector main body 2 (the cable storage portion 23). In this case, the long hole 42 may be formed so as to extend in the Z-axis direction.

For example, in the power feed connector A of the above-described embodiment, the movement directions of the connector main body 2 and the second end 3B of the operation lever portion 3 are configured to coincide with each other. However, the embodiment is not limited thereto. For example, the movement directions of the connector main body 2 and the second end 3B of the operation lever portion 3 may be configured to be opposite to each other. In this case, for example, the lever main body 31 may be formed in a bent manner such that the first end 3A and the second end 31B of the lever main body 31 are positioned on the upper side of the tubular case 1 from the intermediate portion 31C.

In the above-described embodiment, description has been given regarding the power feed connector A included in the charging apparatus for an electric automobile. However, the power feed connector of the present invention can be applied to the charging apparatus for various types of electromotive machines driven by electric power.

DESCRIPTION OF THE REFERENCE SYMBOLS

A POWER FEED CONNECTOR, B POWER RECEIVING CONNECTOR, 1 TUBULAR CASE, 1a FRONT END OPENING PORTION, 12 OPEN HOLE, 12a,12b CONTACT SURFACE, 13 RIDGE PORTION, 14 DISPLAY LAMP, 2 CONNECTOR MAIN BODY, 2A RETREATED POSITION, 2B ADVANCED POSITION, 21 POWER FEEDING SIDE TERMINAL (TERMINAL), 3 OPERATION LEVER PORTION, 3A FIRST END, 3B SECOND END, 31C INTERMEDIATE PORTION, 32 COVER PORTION, 36 BELT-LIKE PLATE MATERIAL, 37 EXTENSION PORTION, 38 COVERING PORTION (OPEN HOLE COVERING PORTION, LAMP COVERING PORTION), 4 LINK MECHANISM, 5 GRIP PORTION, L1 CENTRAL AXIS, L3 ROTATION AXIS

The invention claimed is:

1. A power feed connector which is connected to a power receiving connector of an electromotive machine and supplies electric power to the electromotive machine, the power feed connector comprising:
a tubular case that is formed to have a tubular shape and has a front end opening portion being open at a front end in a central axis direction thereof;
a connector main body that is accommodated inside the tubular case and is slidable in the central axis direction of the tubular case;
an operation lever portion that is turnably and axially supported by the tubular case;
a link mechanism that is directly connected to the connector main body and the operation lever portion and converts a turning motion of the operation lever portion into a linear motion of the connector main body in the central axis direction; and
a grip portion that is integrally provided with the tubular case and extends in a direction intersecting the central axis direction,
wherein a first end of the operation lever portion is disposed inside the tubular case,
a second end of the operation lever portion protrudes outward through the open hole formed at a rear end of the tubular case, is disposed in the rear end portion of the tubular case regardless of a turning position of the operation lever portion, and is positioned on an inner side from both end portions of the tubular case in a width direction, the width direction being a direction orthogonal to the central axis direction of the tubular case and the extending direction of the grip portion,
the first end of the operation lever portion is axially supported by the tubular case,
an intermediate portion of the operation lever portion is joined to the connector main body through the link mechanism, and
the operation lever portion is formed in a bent manner such that the second end is positioned on a rear side from the intermediate portion regardless of the turning position of the operation lever portion.

2. The power feed connector according to claim 1, wherein the connector main body is movable between a retreated position and an advanced position, the retreated position being positioned on a rear side of the tubular case, and the advanced position being positioned on a front side of the tubular case, and
the second end of the operation lever portion is positioned near a central axis from an outer circumferential surface of the tubular case in a state where the operation lever portion is disposed at a position corresponding to the retreated position of the connector main body.

3. The power feed connector according to claim 1, wherein a pair of contact surfaces which face each other in a turning direction of the operation lever portion and with which the operation lever portion can come into contact is formed on an inner circumferential surface of the open hole, and
when the operation lever portion comes into contact with the contact surfaces, movement of the connector main body in the central axis direction is restricted.

4. The power feed connector according to claim 1, wherein the operation lever portion includes two belt-like plate materials which are disposed so as to have a space therebetween in a rotation axis direction thereof.

5. A power feed connector which is connected to a power receiving connector of an electromotive machine and supplies electric power to the electromotive machine, the power feed connector comprising:
a tubular case that is formed to have a tubular shape and has a front end opening portion being open at a front end in a central axis direction thereof;
a connector main body that is accommodated inside the tubular case and is slidable in the central axis direction of the tubular case;
an operation lever portion that is turnably and axially supported by the tubular case;
a link mechanism that is directly connected to the connector main body and the operation lever portion and converts a turning motion of the operation lever portion into a linear motion of the connector main body in the central axis direction; and
a grip portion that is integrally provided with the tubular case and extends in a direction intersecting the central axis direction,
wherein a first end of the operation lever portion is disposed inside the tubular case,
a second end of the operation lever portion protrudes outward through the open hole formed at a rear end of the tubular case, is disposed in the rear end portion of the tubular case regardless of a turning position of the operation lever portion, and is positioned on an inner side from both end portions of the tubular case in a width direction, the width direction being a direction orthogonal to the central axis direction of the tubular case and the extending direction of the grip portion,
a ridge portion is formed on a circumferential edge of the open hole of the tubular case, protrudes from an outer surface of the tubular case, and surrounds the open hole, and
the operation lever portion further includes an open hole covering portion which covers the open hole and the ridge portion from the outer surface side of the tubular case.

6. The power feed connector according to claim 5, wherein the connector main body is movable between a retreated position and an advanced position, the retreated position being positioned on a rear side of the tubular case, the advanced position being positioned on a front side of the tubular case, and
the second end of the operation lever portion is positioned near a central axis from an outer circumferential surface of the tubular case in a state where the operation lever portion is disposed at a position corresponding to the retreated position of the connector main body.

7. The power feed connector according to claim 5, wherein a pair of contact surfaces which face each other in a turning direction of the operation lever portion and with which the operation lever portion can come into contact is formed on an inner circumferential surface of the open hole, and when the operation lever portion comes into contact with the contact surfaces, movement of the connector main body in the central axis direction is restricted.

8. The power feed connector according to claim 5, wherein the operation lever portion includes two belt-like plate materials which are disposed so as to have a space therebetween in a rotation axis direction thereof.

9. A power feed connector which is connected to a power receiving connector of an electromotive machine and supplies electric power to the electromotive machine, the power feed connector comprising:
   a tubular case that is formed to have a tubular shape and has a front end opening portion being open at a front end in a central axis direction thereof;
   a connector main body that is accommodated inside the tubular case and is slidable in the central axis direction of the tubular case;
   an operation lever portion that is turnably and axially supported by the tubular case;
   a link mechanism that is directly connected to the connector main body and the operation lever portion and converts a turning motion of the operation lever portion into a linear motion of the connector main body in the central axis direction; and
   a grip portion that is integrally provided with the tubular case and extends in a direction intersecting the central axis direction,
   wherein a first end of the operation lever portion is disposed inside the tubular case,
   a second end of the operation lever portion protrudes outward through the open hole formed at a rear end of the tubular case, is disposed in the rear end portion of the tubular case regardless of a turning position of the operation lever portion, and is positioned on an inner side from both end portions of the tubular case in a width direction, the width direction being a direction orthogonal to the central axis direction of the tubular case and the extending direction of the grip portion,
   a display lamp that is provided in the rear end portion of the tubular case and is lit so as to issue notification of a state where electric power is supplied to the electromotive machine,
   the connector main body is movable between a retreated position and a advanced position, the retreated position being positioned on a rear side of the tubular case, and the advanced position being positioned on a front side of the tubular case, and
   the operation lever portion is disposed on the outer surface of the tubular case, and further includes a lamp covering portion which covers the display lamp in a state where the connector main body is disposed at the retreated position and exposes the display lamp to the outside of the tubular case in a state where the connector main body is disposed at the advanced position.

10. The power feed connector according to claim 9, wherein the connector main body is movable between a retreated position and an advanced position, the retreated position being positioned on a rear side of the tubular case, the advanced position being positioned on a front side of the tubular case, and the second end of the operation lever portion is positioned near a central axis from an outer circumferential surface of the tubular case in a state where the operation lever portion is disposed at a position corresponding to the retreated position of the connector main body.

11. The power feed connector according to claim 9, wherein a pair of contact surfaces which face each other in a turning direction of the operation lever portion and with which the operation lever portion can come into contact is formed on an inner circumferential surface of the open hole, and when the operation lever portion comes into contact with the contact surfaces, movement of the connector main body in the central axis direction is restricted.

12. The power feed connector according to claim 9, wherein the operation lever portion includes two belt-like plate materials which are disposed so as to have a space therebetween in a rotation axis direction thereof.

* * * * *